United States Patent [19]
Evans

[11] Patent Number: 5,794,881
[45] Date of Patent: Aug. 18, 1998

[54] GEL TENSIONING DEVICE

[75] Inventor: Nigel Evans, Sutton Coldfield, United Kingdom

[73] Assignee: Light & Sound Design, Ltd., Birmingham, England

[21] Appl. No.: 634,658

[22] Filed: Apr. 18, 1996

Related U.S. Application Data

[60] Provisional application No. 60/014,940, Apr. 5, 1996.

[51] Int. Cl.$^6$ .......................... B65H 23/04; B65H 18/08
[52] U.S. Cl. .................. 242/410; 242/420; 242/538.1; 242/538.3; 242/375; 40/471; 40/581; 362/278
[58] Field of Search ............................ 242/410, 420, 242/420.1, 58.1, 538.3, 375, 375.1, 375.2, 373; 267/156; 362/278; 40/347, 387, 471, 522, 581; 160/241, 310; 74/411

[56] References Cited

U.S. PATENT DOCUMENTS

| | | | |
|---|---|---|---|
| 499,960 | 6/1893 | Brooks | 40/387 |
| 681,864 | 9/1901 | Wallace et al. | 242/375 |
| 1,446,103 | 2/1923 | Perry | 242/538.1 |
| 2,034,543 | 3/1936 | Twiss et al. | 242/375 |
| 2,063,799 | 12/1936 | Fornelius et al. | 267/156 |
| 2,833,027 | 5/1958 | Foster | 267/156 |
| 3,081,047 | 3/1963 | Kilburg | 242/538.1 |
| 3,099,397 | 7/1963 | Abbott | 242/538.3 |
| 3,107,358 | 10/1963 | Prout | 267/156 |
| 4,009,843 | 3/1977 | Gomez | 242/375 |
| 4,015,792 | 4/1977 | Thenon et al. | 242/538.1 |
| 4,773,176 | 9/1988 | Grehan | 40/387 |
| 4,813,627 | 3/1989 | Nelson | 242/373 |

*Primary Examiner*—John M. Jillions
*Attorney, Agent, or Firm*—Fish & Richardson P.C.

[57] ABSTRACT

A gel tensioning device maintains tension on a gel. The gel is wound between two rollers as the diameters of the rollers change by rolling and unrolling the gel, the amount of movement between the two rollers also changes. This difference in movement is absorbed by a spring that biases the rollers relative to one another. The present invention preferably applies force to one of the rollers, that one roller connects to a special spring assembly and through that special spring assembly to the other roller. The special spring assembly includes a special kind of spring, which has desirable characteristics but is susceptible to reverse winding. A roller clutch allows force to be applied to the spring in the winding direction only and not in the non-winding direction. This prevents damage to the spring from any reverse winding.

22 Claims, 4 Drawing Sheets

GEL TENSIONING DEVICE

Application claims priority from provisional application 60/014,940 filed Apr. 5, 1996.

This invention relates to a tensioning device for maintaining tension in a flat planar sheet during rolling and unrolling. More particularly, the present invention describes a device for maintaining relative tension between rollers of a color-changing gel while the gel is moved, by changing the relative amount of gel between the rollers.

BACKGROUND AND SUMMARY OF THE INVENTION

Color changing material often uses a gel—a plastic colored film—to change the color of light used to illuminate a stage. Colored gel is commonly formed as an elongated plastic sheet with a color that varies along its length. Different positions of the gel have a different color. The colored gel is tensioned between a pair of rollers. The color is changed by unrolling the gel from one roller and rolling it onto a second roller. Light shines through the gel to project a color that is dependent on the position of the gel on the rollers.

During this rolling and unrolling process, it is desirable to keep the colored gel under a constant amount of tension to prevent any slack from jamming the rollers. This also allows projecting a better color and ensures that the light shining through the gel is of the proper color and of uniform intensity.

Springs have been used to bias the rollers relative to one another to maintain the tension on the gel. These systems have typically used a torsion spring connected directly to one of the rollers. That roller is tensioned relative to the other roller.

However, applicants have noticed certain drawbacks in current systems of this type. Miniaturization of these systems is desirable; however it is difficult for small diameter rollers to maintain proper tension of the gel. One problem is that the effective diameter of each roller increases or decreases as the position of the gel changes due to the gel stacking up on one roller and consequently un-stacking from the other roller. This means that to maintain even tension on the section of gel between the two rollers, each roller needs to rotate at a different constantly changing speed relative to the other, except for the single instant when both rollers contain the same amount of gel. A spring is used to absorb the difference in rotation of the two rollers and so maintain tension on the gel. If small diameter rollers are used, however, the large variations in their relative speeds can cause considerable tension to accumulate in the spring.

Another problem is the possibility of damage to the spring if the tension is suddenly released for any reason, (such as when the gel is routinely removed for replacement or if a drive belt accidentally becomes detached etc). In this instance it is possible for the mechanical parts associated with the spring to build inertia as the spring unwinds itself so causing the spring to attempt to reverse-wind after all tension is released. This can easily break many springs, and hence render the unit inoperable.

In an attempt to minimize these problems, larger diameter rollers have traditionally been used along with springs which can accept some degree of reverse winding. The larger rollers allow the effective diameter of each roller to remain sufficiently constant that the spring tension changes only minimally as the gel moves from one roller to the other. However, due to their non-linear nature, springs which do permit a degree of reverse winding invariably require a certain amount of pre-tensioning to first establish a useable spring force (torque). Also, in order to avoid excessive spring force building up over the required operating range, these springs need to be used around the middle region of their operating range, meaning they have been physically larger than is theoretically required. This, along with the size of the rollers, is inconsistent with the goal of miniaturization.

In view of these problems that were recognized by the inventors, it is an objective of this invention to provide a gel tensioning device which maintains a substantially constant tension on the colored gel regardless of the amount of gel rolled on either of a pair of rollers. It is another objective of this invention to provide a gel tensioning device which will adjust the tension applied to the gel in accordance with the difference in rotational rate of the rollers holding the gel.

It is another object of the invention to allow the use of a spring of the type that can be damaged from reverse winding with a gel tension device.

It is another object of the invention to use a spring that is pre-stressed. By pre-stressed, we mean that the spring is always under stress so any force on the spring immediately causes tension. These devices have not been used because of their sensitive nature. The present invention uses a unique protection device to protect the spring, thereby, for the first time, enabling the use of this kind of spring in this environment.

A preferred embodiment of this invention defines a gel tensioning device which has a frame, a pair of rollers rotatably disposed on the frame and an element for rotating one of the rollers. The gel is disposed about both of the rollers and causes the second roller of the pair to rotate.

A biasing element is provided for absorbing a difference in rotation between each of the rollers. The biasing element uses a spring element which is not capable of accepting an applied reverse bias, preferably, the biasing element includes a biasing pulley with an inner and an outer pulley element which are independently rotatable. A special kind of reverse-wound spring is connected between the outer and inner pulleys, such that rotation of the outer pulley relative to the inner pulley causes tension to be built up in the spring. Because the rotation of the outer and inner pulleys corresponds directly to the rotation of the rollers holding the gel, only the relative rotation of the two rollers is sensed by the biasing pulley. The difference in rotation amount causes tension to build up in the spring.

More generally, however, any connection of spring force to the gel is possible. The spring, more generally, could be any kind of spring that is intended to be biased in a first direction and that could be changed by biasing in the opposite direction.

Most preferably, the spring driving the biasing pulley is a reverse-wound constant force spring having a flat central portion. A shaft on which the inner and outer pulleys are disposed has a cut portion which engages the flat central portion of the spring.

BRIEF DESCRIPTION OF THE DRAWINGS

The above objects and features of this invention will be apparent to those skilled in the art from the following description of the preferred embodiments thereof when considered in conjunction with the appended drawings in which.

DESCRIPTION OF THE PREFERRED EMBODIMENT

Figure 1:
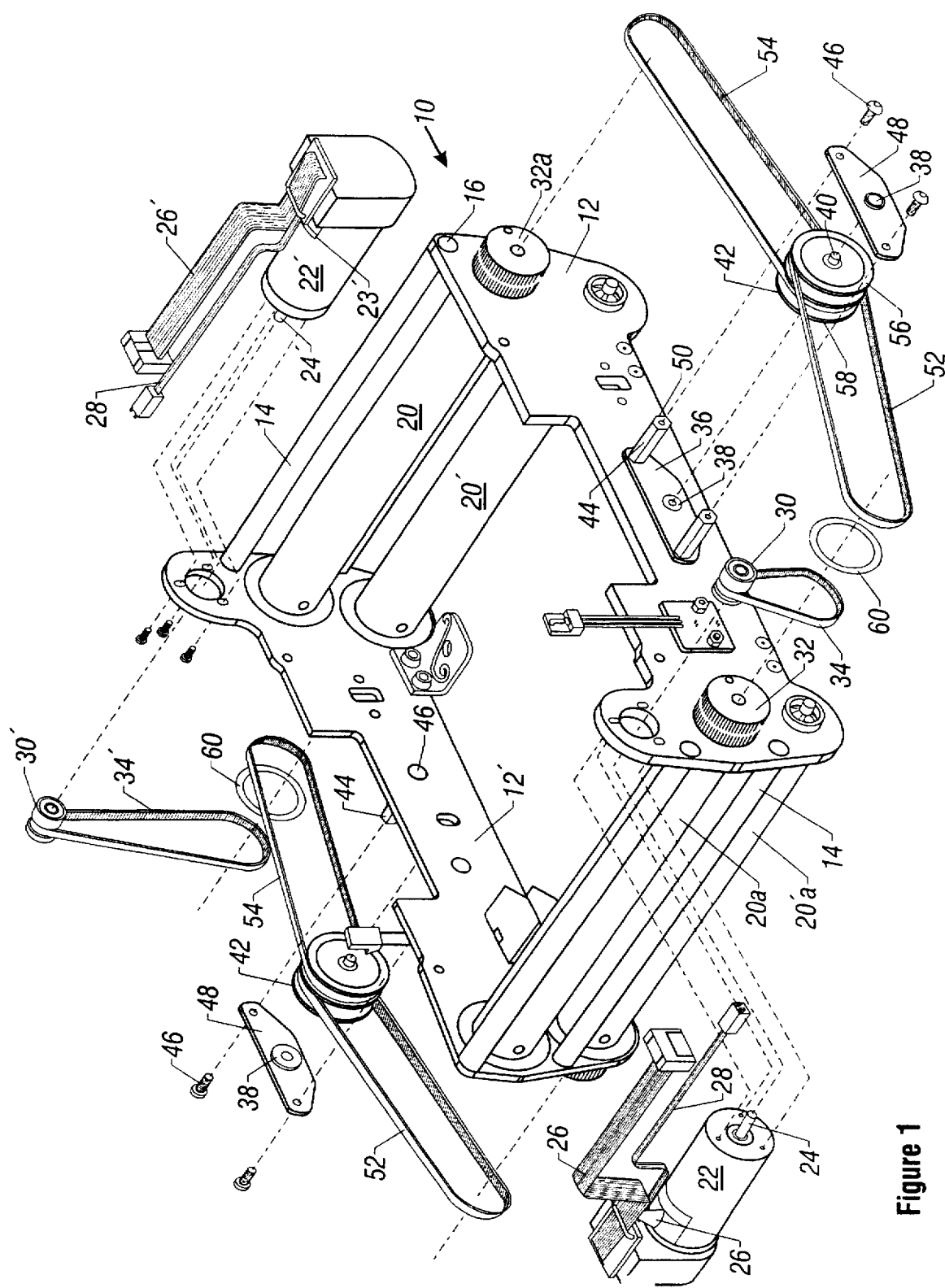
FIG. 1 is a perspective expanded view of a preferred embodiment of a gel tensioning device of this invention.

FIG. 1 shows a preferred embodiment of the overall gel color changer unit, including a gel tensioning device of the present invention.

Color changer unit 10 has frame ends 12 separated by spacing rods 14 and gel holding rollers 20. The preferred device 10 has accommodation for two separate color changing gels. Of course, the techniques described herein are quite usable with a single gel roller system. Frame ends 12 and spacing rods 14 are preferably joined together by bolts 16 threadably engaged in threaded apertures in spacing rods 14. Alternatively any technique of forming this frame can be used, including, for example, casting or molding.

The gel members 20a (first gel) and 20' and 20a' (second gel) rollers 20 are rotatably supported between frame ends 12. Tensioning gel rollers 20 are rotatably mounted on bearings to reduce the amount of friction between the tensioning gel rollers and the frame ends and so that tensioning gel rollers remain freely rotatable.

Drive motor 22 is mounted to the upper edge of frame ends 12 or at any other suitable place. An output shaft 24 of drive motor 22 is preferably positioned to extend outside of gel tensioning device 10. Motor 22 is controlled by an appropriate computer or control device. The motor 22 receives power through DC power supply cable 28 when controlled by the computer or control device. Motor 22 includes an associated encoder 23 which provides a signal indicative of an amount of movement thereof through cables 26 thereby allowing control by computer. Drive motor 22 drives one set of rollers 20, 20a, while the other drive motor 22' drives the other set of rollers 20' , 20a' . The remainder of this description will apply to the first set of rollers only, but it should be understood that the same operation would apply to the second set of rollers.

The preferred operation of the present invention operates as follows. Drive motor 22 produces power at shaft 24, which is coupled to pulley 30, and to belt 34. Belt 34 drives pulley 32. pulley 32 is also attached, via belt 52, to biasing element 42, which is also connected via belt 54 to pulley 32a.

Rotational motion of drive motor 22 is directly translated into rotational motion of only the gel tensioning roller 20a. The biased attachment of the two elements causes the slave rotation of the other gel tensioning roller 20.

FIG. 1 shows frame ends 12, 12' having a bracket 36 disposed in a middle portion. Bearing 38 receives an axle 40 of biasing pulley 42. Standoffs 44 hold bracket plate 48. Bracket plate 48 supports the other end of biasing pulley 42 via bearing 38.

Belts 52 and 54 are trained about first and second pulley trenches 56 and 58 of biasing pulley 42 respectively. Spacer ring 60 is disposed between belt 34 and belt 52 on pulley 32 to prevent these belts from chafing against each other. The above has described the preferred embodiment of the invention. The following describes more detail about the unit itself.

One important feature of the present invention is the use of an Extended Eye SPIRATOR (TM) Spring. This preferred spring is a reverse wound constant force spring 200 with a special detail portion 202 which includes an extending member having surfaces that are adapted for contacting a slot in a shaft. This special detail portion will contact slot 312 and shaft 310, at the inner end of the coil. This compares with a simple torsion spring or a clock spring. This spring has many desirable properties, but, however, would be broken by application of any significant reverse bias. Those having ordinary skill in the art have avoided using a spring like this. To avoid reverse bias, a special one-way clutch allows transmission of force to the spring in one direction only.

The preferred spring of the present invention is made by Ametek - Hunter Spring division. The benefits of this type of spring over similar looking products include the evenness and level of torque over many turns for a given package size. With a clock spring or a regular wire torsion spring there is usually a steady increase in torque (or spring resistance) as more turns are applied. A clock spring is similar in appearance to a spirator spring. However, it allows far less turns to be achievable in the same given package size. To achieve an even torque level and sufficiently quick response time over a number of turns with a wire torsion spring, the amount of coils in the spring must be such that the spring needs to be very long, (like a slinky), which is bulky and limits its placement options. These springs have invariably ended up inside one of the rollers.

While placement of the spring inside the roller is not excluded by the present invention, it is less preferred than the FIG. 1 embodiment which uses a separate spring element that is attached between the rollers. A torsion spring inside a roller can produce significant maintenance problems. The act of physically applying tension to the spring while fitting the gel is difficult: requiring turning the roller body by hand and then holding that roller while sticking the gel to it and not your fingers.

Because it is desirable to keep the product package size to a minimum, small diameter rollers are used, which means that as the gel rolls from one roller to the other, fairly large differences in relative speed and subsequently number of rotations between the two rollers occur. The preferred embodiment of the present invention, in fact, has a rotation difference of about 5. Therefore to keep an even tension on the gel, the spring needs to maintain even and sufficient torque (or resistance) throughout that many turns. The Extended eye Spirator Spring is able to achieve this requirement in a small package size.

The springs preferably used according to the present invention could be damaged by being wound backwards or suddenly being released from fully wound under load conditions. A wire torsion spring will buckle and become misshapen and both a clock spring and a spirator spring will simply break at the center section if enough force or inertia is applied. A typical example of this is when a gel scroll is being changed and the old scroll is first detached from one or other of the rollers. At this stage it is very easy to let go of either the gel or the roller, both of which will result in immediate release of the springs tension and possible damage to the spring due to the inertia of the mechanical components attached to it, (i.e., rollers, pulleys etc.)

The present invention allows this to happen by using a safety device in the assembly to prevent such damage from occurring. The roller clutch used in the present invention allows force transmission in one direction only. This hence effectively prevents back winding due to either direct rotation, or by inertia due to sudden release of accumulated spring tension.

When there is tension in the spring, the clutch grips the shaft and provides a solid rotation base between the shaft and the pulley. If the spring is unwound, the clutch will continue to grip the shaft until all the spring tension is gone. At that point, the clutch slips, allowing the pulley to rotate freely on the shaft in the non-winding direction, thus preventing any damage to the spring.

Figure 2:
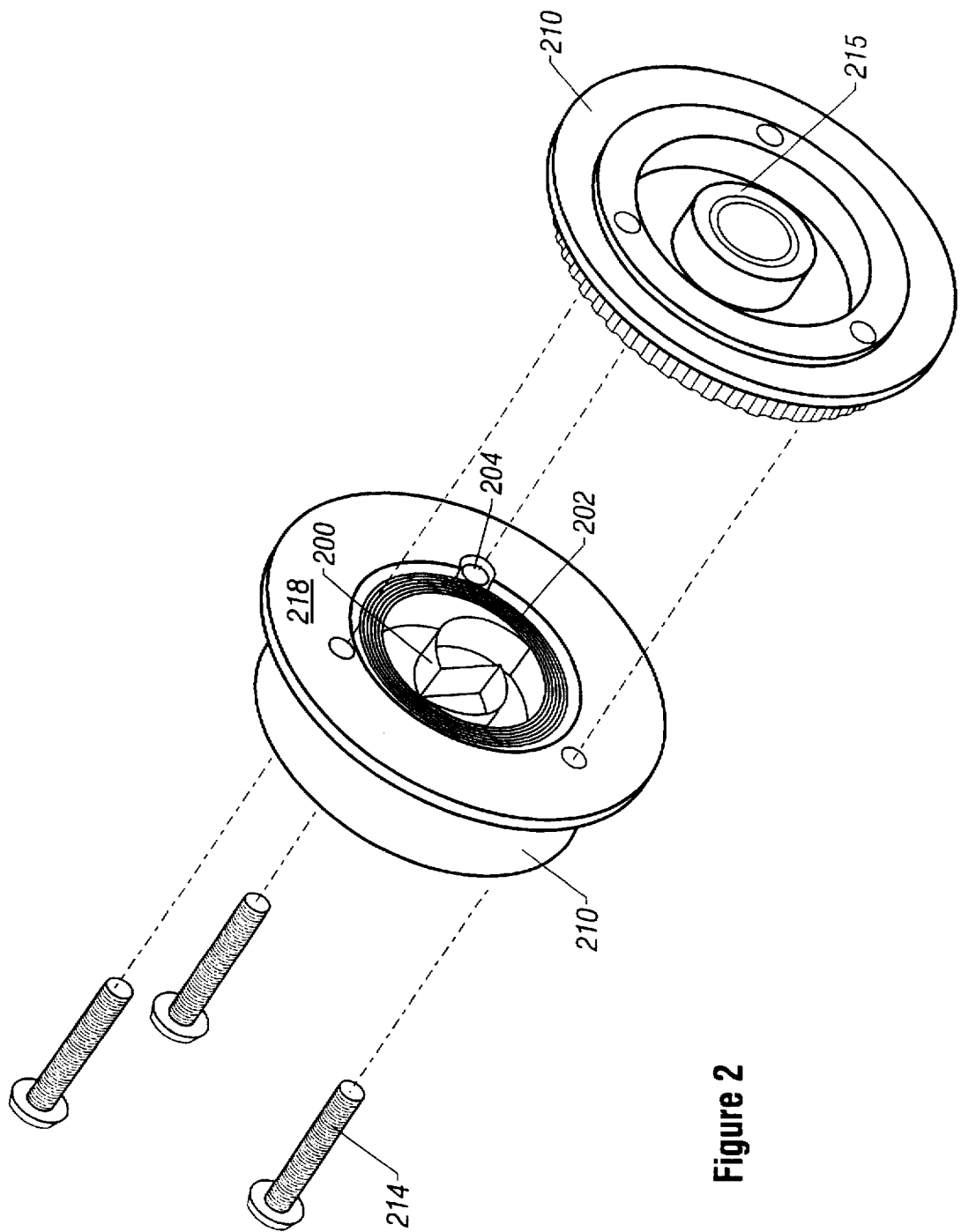
FIG. 2 is a perspective view of one portion of the biasing pulley for use in this invention.

FIG. 2 shows an exploded view of the spring pulley of the present invention. The element is conceptually formed of two connected pieces: Spring housing 210 and pulley 212. Fixing screws 214 hold the spring housing 210 to the pulley 212 as explained herein. A first end loop 204 of spring 200 is held in one of the holes within the spring housing, anchored by one of the fixing screws. The centermost portion 202 is in the area of bearing 215 which has been pressed into the pulley. The pulley also includes a pulley flange 218 on the spring housing. As described above, the spring is preferably an extended eye spirator spring.

Figure 3:
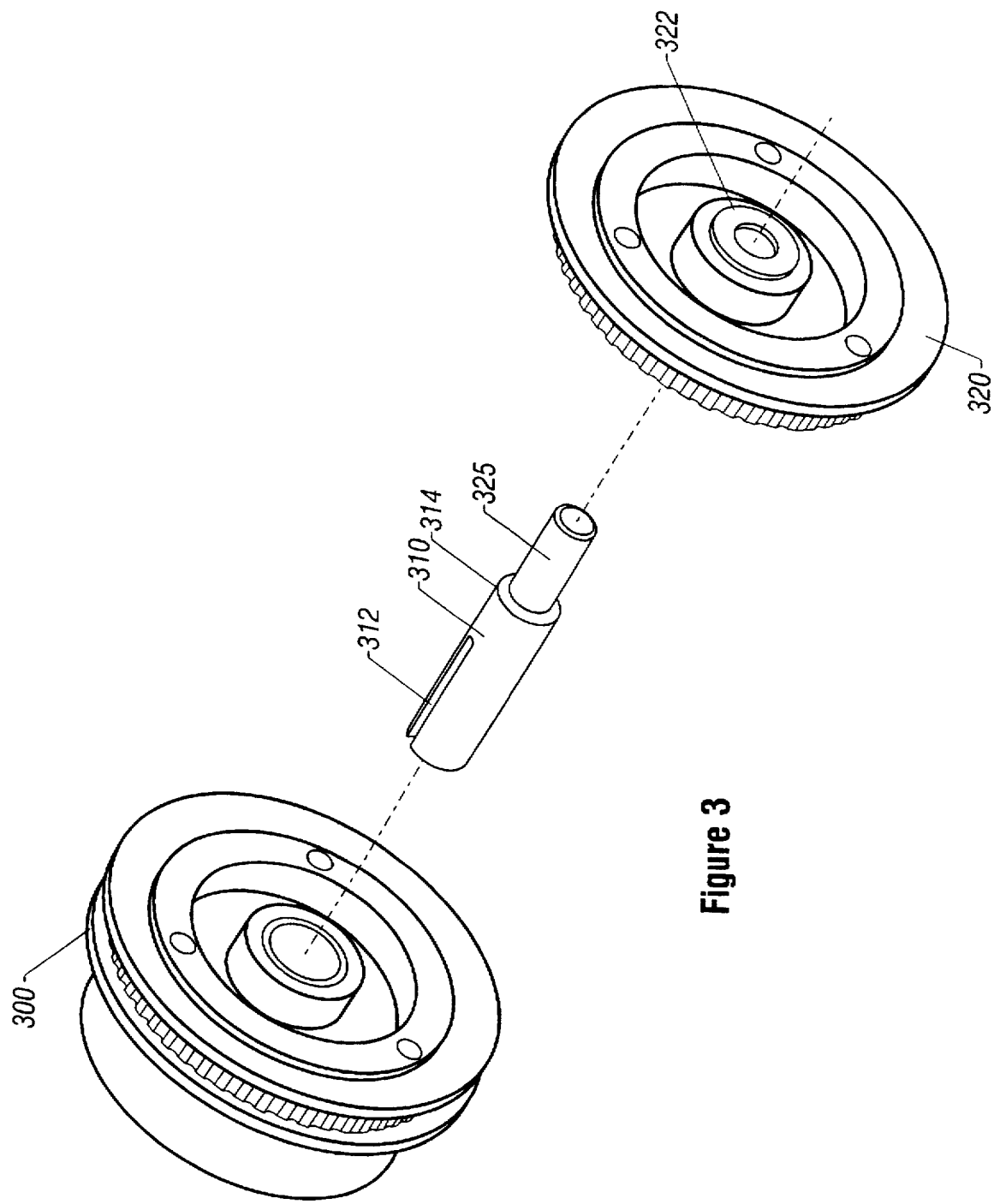
FIG. 3 is a perspective expanded view of another portion of the biasing pulley for use in this invention.

The pulley in FIG. 2 is assembled as element 300 shown in FIG. 3. Shaft 310 includes a slot 312 which extends over and butts against element 202. This goes over the flat portion in the center of the spring. A rotating surface 314 is able to rotate within the bearing of the pulley 300.

A second pulley 320 includes a surface with a roller clutch 322 that is pressed into the pulley. Roller clutch 322 grips the roller clutch surface 325. The clutch either grips or slips on this surface depending on the direction of rotation.

Figure 4:
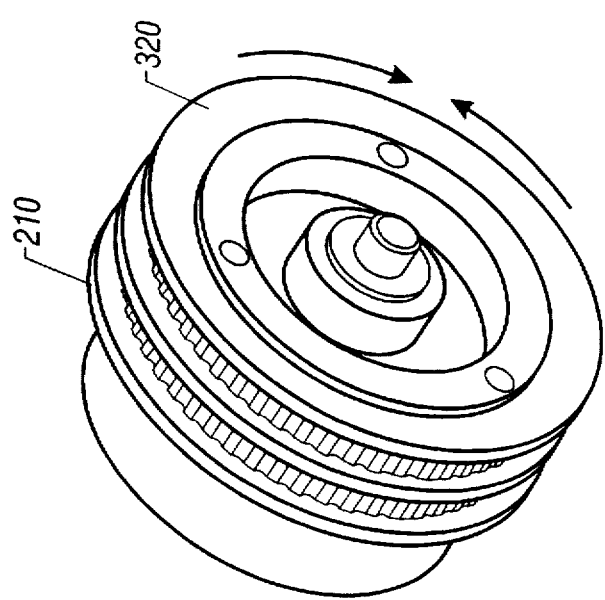
FIG. 4 is a perspective view of another portion of the biasing pulley for use in this invention.

The final assembled device is shown in FIG. 4. This includes the two pulleys 300 and 320. In this example, when pulley 320 is rotated in the clockwise direction, the clutch freewheels and hence nothing happens to the spring. When pulley 320 is rotated in the counterclockwise direction, it causes the spring clutch 322 to grip the shaft 325 and hence winds the spring 200 inside the pulley 300.

The roller clutches of this type are well-known in the art, and are commercially available. They operate typically on the principle of wedging needles into a taper. In one direction the needles are wedged into the taper and hence causing friction against the shaft. In the other direction, the taper is of a different shape which allows the needles to rotate and hence causes freewheeling. These are often called a drawn-cup roller clutch and are available from INA and/or Torrington.

In operation, motor 22 turns output shaft 24 upon input of signals from a controller. The output shaft 24 turns pulley 30 which in turn moves belt 34. Belt 34 imparts motion to double pulley 32 to thereby rotate tensioning gel roller 20a. Rotation of gel roller 20a moves the colored gel to thereby cause rotation of the other gel roller 20 around which the colored gel is wound.

Rotation of the double pulley 32 is transferred to the biasing pulley 42 through both belts 52 and 54. Any difference in rotational rate between the two pulleys due to different effective diameters of gel tensioning rollers (due to multiple layers of colored gel) is absorbed by the tensioning spring 200.

This technique allows using a specialized spiral spring, or more generally, any spring that could be damaged by reverse bias forces. Tension is provided by absorbing the difference between the rotational rates of the rollers. Because the spring only needs to compensate for the difference between rotational rates of the gel tensioning rollers, substantially uniform tension can be applied to the colored gel regardless of the area of the gel which is to be accessed. Moreover, the one way clutch prevents recoil.

It would of course be possible to use other types of one-way clutches to prevent recoil, such as a ratcheting system. Further, a person of ordinary skill in the art would recognize that other types of rotation devices could be used instead of the belt and pulley system, such as a directly gearing the output of the motor shaft to the respective pulleys and rotors or through the use of a chain drive or shaft drive systems.

The spring/clutch assembly could be directly mounted on the roller.

Although this invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What I claim is:

1. A sheet tensioning device, comprising:
   a frame;
   a first roller and a second roller rotatably mounted on said frame;
   a rotation device coupled to one of said rollers and operating to rotate said one of said rollers;
   a spring connected in a way to maintain a tension in a first rotational direction between said first and second rollers, said spring being of a type that could be damaged by force in a second rotational direction, and
   a one way force imparting element, coupled between said spring and said first roller, and coupling force between said spring and said first roller only in said first rotational direction.

2. The sheet tensioning device of claim 1, wherein said rotation device comprises a motor coupled to one of said rollers.

3. The sheet tensioning device of claim 1, further comprising a tension imparting pulley including an inner pulley surface and an outer pulley surface, and wherein said spring is tensionally connected between said outer and inner pulley surfaces, such that rotation of said outer pulley surface relative to said inner pulley surface in said first rotational direction biases tension into said spring.

4. The sheet tensioning device of claim 1, wherein said spring is a spiral spring having a flat central portion, further comprising a shaft connected to said flat central portion engaging with said flat central portion of said spiral spring.

5. The sheet tensioning device of claim 4, wherein said spiral spring is a reverse wound constant force spring.

6. The sheet tensioning device of claim 1, wherein said spring is a type that is pre-tensioned.

7. A device as in claim 1 wherein said one way force imparting element is a roller clutch which allows force to be transmitted only in a first direction.

8. A sheet tensioning device, comprising:
   a frame having first and second sides;
   spacing rods disposed between and rigidly attached to said frame sides, said spacing rods holding said frame sides in facing relationship, spaced apart at a predetermined distance;
   first and second rollers, each of said first and second rollers being rotatably mounted on said frame between said sides, each of said first and said second rollers having an axis of rotation around which they are rotated,
   a portion of at least said first roller extending through a surface in one of said frame sides, said portion being substantially cylindrical and concentrically disposed with said axis of rotation of said first roller;

a motor mounted on said frame, said motor having an output part from which rotational power and torque generated by said motor is transmitted;

a rotational motion transmission device, coupled between the output part of said motor and said first roller, said rotational motion transmission device transmitting said rotational power and torque from said output part of said motor to said first roller;

a spring coupled at least to one of said rollers, said spring being connected in a way such that rotation of one of said rollers relative to the other of said rollers in a first direction builds up potential energy in said spring, wherein said spring is of a type such that potential energy in a second direction will cause damage to the spring; and a single direction clutching mechanism which allows force to be transmitted to the spring in only a first direction from said at least one of said rollers.

9. A sheet tensioning device as in claim 8, wherein said sheet is a color changing media attached between said first and second rollers.

10. A sheet tensioning device as in claim 8, wherein said spring is a spiral spring.

11. A sheet tensioning device as in claim 8, wherein said spring is a pre-tensioned type spring.

12. A device as in claim 8 wherein said one way force imparting element is a roller clutch which allows force to be transmitted only in a first direction.

13. A method of tensioning a flat sheet of media between first and second cylindrical media holders, comprising:

winding the sheet of media on the first and second cylindrical media holders;

rotating one of said holders;

absorbing a difference in rotational rate between said rollers while there is tension between the rollers and preventing force from reaching the roller when there is no tension between the rollers;

connecting a spring bias element and a one way clutch between the rollers;

allowing spring bias against said one roller in a first direction of movement other than said one direction of movement only; and said clutch slipping to avoid spring bias in a direction of movement other than said one direction of movement.

14. A color changer, comprising:

first and second rollers, each holding color changing media thereon;

a rotating element which rotates one of said rollers;

a spring which holds tension between said rollers; and a one way clutch device, which protects said springs.

15. A color changer as in claim 14, wherein said spring is pre-stressed.

16. A color changer as in claim 14, wherein said spring is of a type that does not allow reverse bias thereon.

17. A device as in claim 14, wherein said one way force imparting element is a roller clutch which allows force to be transmitted only in a first direction.

18. A one-way force device, comprising:

first and second rollers connected by a sheet that is rolled relative to said first and second rollers, said first and second rollers having an axis of rotation and a shaft of least partly cocentered with the axis of rotation;

a spring, coupled to at least one of said rollers, and which stores motion between said first and second rollers, said stored motion which is stored being relative motion in a first direction relative to a zero point; and a protection device for absorbing relative motion in a second direction, said protection device including a clutch, selectively gripping said shaft at a position where it is cocentered with the axis of rotation, said selectively gripping operating to allow force in a single direction only.

19. A device as in claim 18, wherein said spring is pretensioned.

20. A device as in claim 18, wherein said one way force imparting element is a roller clutch which allows force to be transmitted only in a first direction.

21. A stage lighting device comprising:

first and second cylindrical units which hold material that is used in stage lighting, and which are rotated relative to one another to change a part of the material which is used, at least one of said units including a shaft which is cocentered with an axis of rotation of said cylindrical unit and is rotated around the axis of rotation;

a force storage element storing force between said first and second units to absorb a difference in rotation amount between said first and second cylindrical units; and a protection element which operates to protect said force storage element against forces that could damage said force storage element, said protection element interacting with said shaft to adjust a force at said axis of rotation.

22. A device as in claim 21 wherein said one way force imparting element is a roller clutch which allows force to be transmitted only in a first direction.

* * * * *